United States Patent [19]

Hedwall

[11] Patent Number: 5,896,168
[45] Date of Patent: Apr. 20, 1999

[54] APPARATUS AND METHOD FOR ADJUSTING VIDEO CHARACTERISTICS OF A CRT SCREEN

[76] Inventor: David J. Hedwall, 9832 Daines Dr., Temple, Calif. 91780

[21] Appl. No.: 08/686,513

[22] Filed: Jul. 26, 1996

[51] Int. Cl.⁶ .................................................. H04N 17/00
[52] U.S. Cl. .......................... 348/179; 348/178; 348/180; 348/185; 348/188
[58] Field of Search ............................ 348/177, 178, 348/179, 182, 183, 184, 185, 188, 180, 189, 645, 649, 673, 686, 687; 345/8

[56] References Cited

U.S. PATENT DOCUMENTS

| | | | |
|---|---|---|---|
| 2,854,505 | 9/1958 | Davis | 348/179 |
| 3,959,811 | 5/1976 | Shanley, II | 348/178 |
| 4,700,218 | 10/1987 | Thomsen et al. | 348/180 |
| 4,706,108 | 11/1987 | Kumagai et al. | 348/178 |

*Primary Examiner*—John K. Peng
*Assistant Examiner*—Wesner Sajous

[57] ABSTRACT

An apparatus and method for adjusting video characteristics of a CRT screen having a plurality of adjustment mechanisms for adjusting visual characteristics of the CRT screen. Further included is a video playback mechanism adapted to display a screen format on the CRT video screen upon the actuation thereof. The screen format comprises a plurality of areas of various colors. A viewing mechanism is included to allow viewing of the screen format of the CRT screen therethrough. Upon viewing the screen format of the CRT screen through the viewing mechanism, a user may manipulate the adjustment mechanisms for properly adjusting the visual characteristics of the CRT screen.

14 Claims, 3 Drawing Sheets

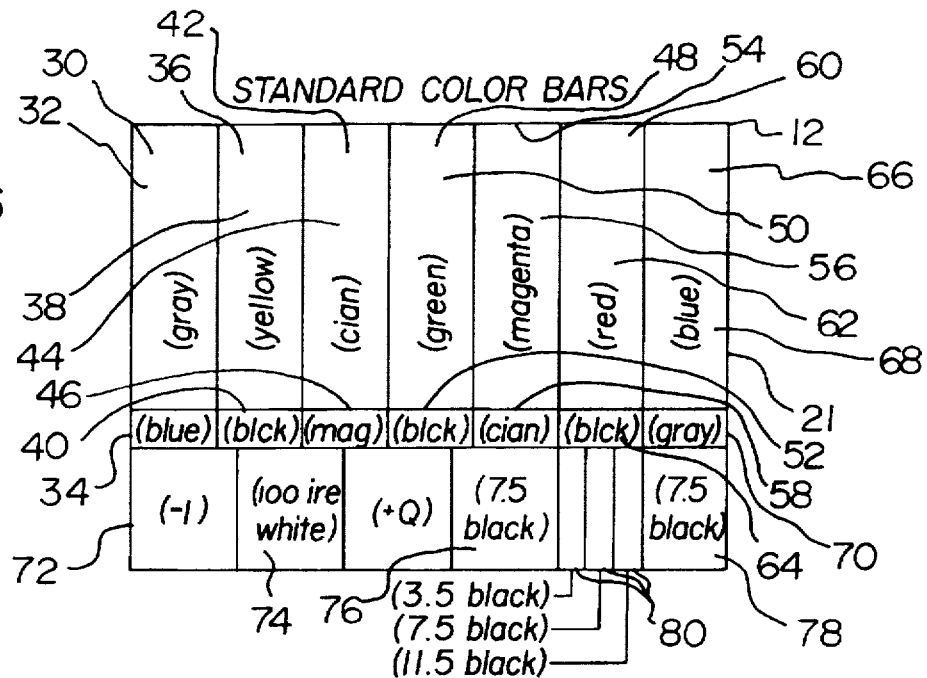
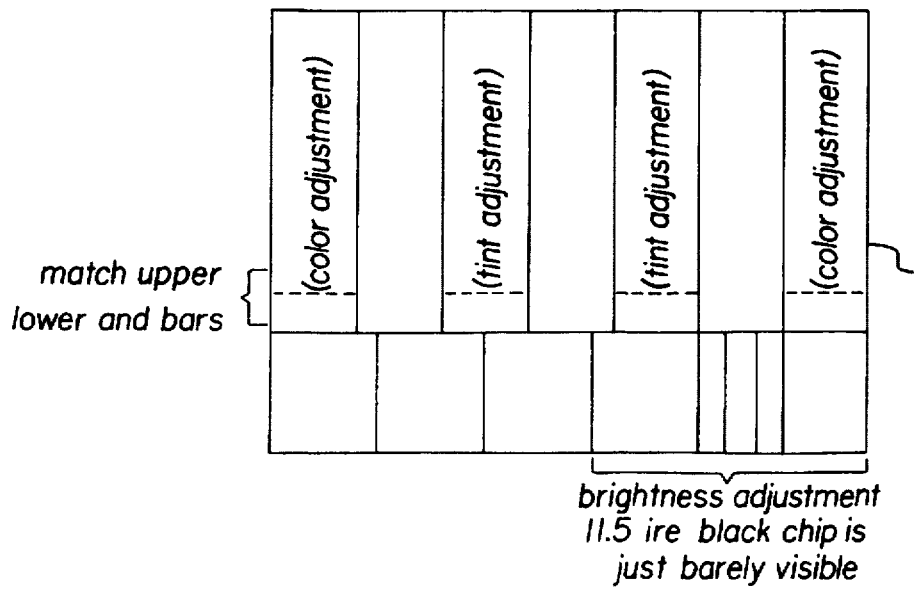

APPARATUS AND METHOD FOR ADJUSTING VIDEO CHARACTERISTICS OF A CRT SCREEN

BACKGROUND OF THE INVENTION

1. Field of the Invention

The present invention relates to an apparatus and method for adjusting video characteristics of a CRT screen and more particularly pertains to properly adjusting the tint, color, and brightness of a CRT screen.

2. Description of the Prior Art

The use of video adjustment mechanisms is known in the prior art. More specifically, video adjustment mechanisms heretofore devised and utilized for the purpose of adjusting the visual characteristics of a CRT screen are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,962,722 to Ciciora; U.S. Pat. No. 4,123,775 to Bugni; U.S. Pat. No. 5,363,152 to Reed, III; U.S. Pat. No. 4,297,142 to Ritze; U.S. Pat. No. 5,218,386 to Levien; and U.S. Pat. No. 5,145,376 to Krass are provided as being of general interest.

In this respect, the apparatus and method for adjusting video characteristics of a CRT screen according to the present invention substantially departs from the conventional concepts and designs of the prior art, and in so doing provides an apparatus primarily developed for the purpose of properly adjusting the tint, color, and brightness of a CRT screen.

Therefore, it can be appreciated that there exists a continuing need for a new and improved apparatus and method for adjusting video characteristics of a CRT screen which can be used for properly adjusting the tint, color, and brightness of a CRT screen. In this regard, the present invention substantially fulfills this need.

SUMMARY OF THE INVENTION

In view of the foregoing disadvantages inherent in the known types of tint, color, and brightness adjustment mechanisms now present in the prior art, the present invention provides an improved apparatus and method for adjusting video characteristics of a CRT screen. As such, the general purpose of the present invention, which will be described subsequently in greater detail, is to provide a new and improved apparatus and method for adjusting video characteristics of a CRT screen which has all the advantages of the prior art and none of the disadvantages.

To attain this, the present invention essentially comprises a CRT screen. For allowing manipulation thereof, the CRT screen has a color adjustment mechanism, shown in FIG. 2, for adjusting the color of the CRT screen. A tint adjustment mechanism is included for adjusting the tint of the CRT screen. In addition, a brightness adjustment mechanism is included for adjusting the brightness of the CRT screen. As shown in FIG. 4, a video playback mechanism is included for displaying a screen format on the CRT video screen upon the actuation thereof. In the preferred embodiment, a video tape is utilized in conjunction with a video cassette recorder electrically connected to the CRT screen. The screen format, as best shown in FIG. 5, has an upper periphery, a lower periphery, a left periphery, and a right periphery. The screen format includes: a vertically oriented first column situated adjacent the left periphery and comprising a gray upper portion and a blue lower portion, a vertically oriented second column situated adjacent the first column and comprising a yellow upper portion and a black lower portion, a vertically oriented third column situated adjacent the second column and comprising a cian upper portion and a magenta lower portion, a vertically oriented fourth column situated adjacent the third column and comprising a green upper portion and a black lower portion, a vertically oriented fifth column situated adjacent the fourth column and comprising a magenta upper portion and a cian lower portion, a vertically oriented sixth column situated adjacent the fifth column and comprising a red upper portion and a black lower portion, and a vertically oriented seventh column situated between the right periphery and the sixth column and comprising a blue upper portion and a gray lower portion. The screen format further includes a horizontally oriented row situated adjacent the lower periphery beneath the lower portion of the each column. The horizontal row comprises a white block, a first black block of a first tone of black color, a second black block of the first tone of black color, and a plurality of strips located between the first black block and second black block. With reference still to FIG. 5, the strips are shown to include a first strip of a second tone of black color positioned adjacent the first black block, a second black strip of a third tone of black color positioned adjacent the second black block, and a third black strip of the first tone of black color positioned between the first black strip and the second black strip. Finally, a viewing mechanism is included for viewing the CRT screen therethrough. In the preferred embodiment, a pair of viewing glasses are utilized with a pair of viewing portions comprising a tinted translucent material. To facilitate wearing by a user, the viewing glasses employ a pair of supports hingably coupled to the viewing portions. In use, upon viewing the screen format of the CRT screen through the viewing mechanism, the third column and the fifth column are utilized in conjunction with the tint adjustment mechanism to afford proper tint adjustment of the CRT screen. As depicted in FIG. 6, the first column and the seventh column are utilized in conjunction with the color adjustment mechanism to afford proper color adjustment of the CRT screen. To afford proper brightness adjustment of the CRT screen, the black blocks and strips are utilized in conjunction with the brightness adjustment mechanism. Lastly, the white block is utilized to check the overall adjustment of the CRT screen.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved apparatus and method for adjusting video characteristics of a CRT screen which has all the advantages of the prior art tint, color, and brightness adjustment mechanisms and none of the disadvantages.

It is another object of the present invention to provide a new and improved apparatus and method for adjusting video characteristics of a CRT screen which may be easily and efficiently manufactured and marketed.

It is a further object of the present invention to provide a new and improved apparatus and method for adjusting video characteristics of a CRT screen which is of a durable and reliable construction.

An even further object of the present invention is to provide a new and improved apparatus and method for adjusting video characteristics of a CRT screen which is susceptible of a low cost of manufacture with regard to both materials and labor, and which accordingly is then susceptible of low prices of sale to the consuming public, thereby making such apparatus and method for adjusting video characteristics of a CRT screen economically available to the buying public.

Still yet another object of the present invention is to provide a new and improved apparatus and method for adjusting video characteristics of a CRT screen which provides in the apparatuses and methods of the prior art some of the advantages thereof, while simultaneously overcoming some of the disadvantages normally associated therewith.

Still another object of the present invention is to properly adjust the tint, color, and brightness of a CRT screen.

Lastly, it is an object of the present invention to provide a new and improved apparatus and method for adjusting video characteristics of a CRT screen having a plurality of adjustment mechanisms for adjusting visual characteristics of the CRT screen. Further included is a video playback mechanism adapted to display a screen format on the CRT video screen upon the actuation thereof. The screen format comprises a plurality of areas of various colors. A viewing mechanism is included to allow viewing of the screen format of the CRT screen therethrough. Upon viewing the screen format of the CRT screen through the viewing mechanism, a user may manipulate the adjustment mechanisms for properly adjusting the visual characteristics of the CRT screen.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a layout of the screen format.

FIG. 6 is a layout of the screen format as viewed through the viewing mechanisms.

Similar reference characters refer to similar parts throughout the several views of the drawings.

DESCRIPTION OF THE PREFERRED EMBODIMENT

Figure 1:
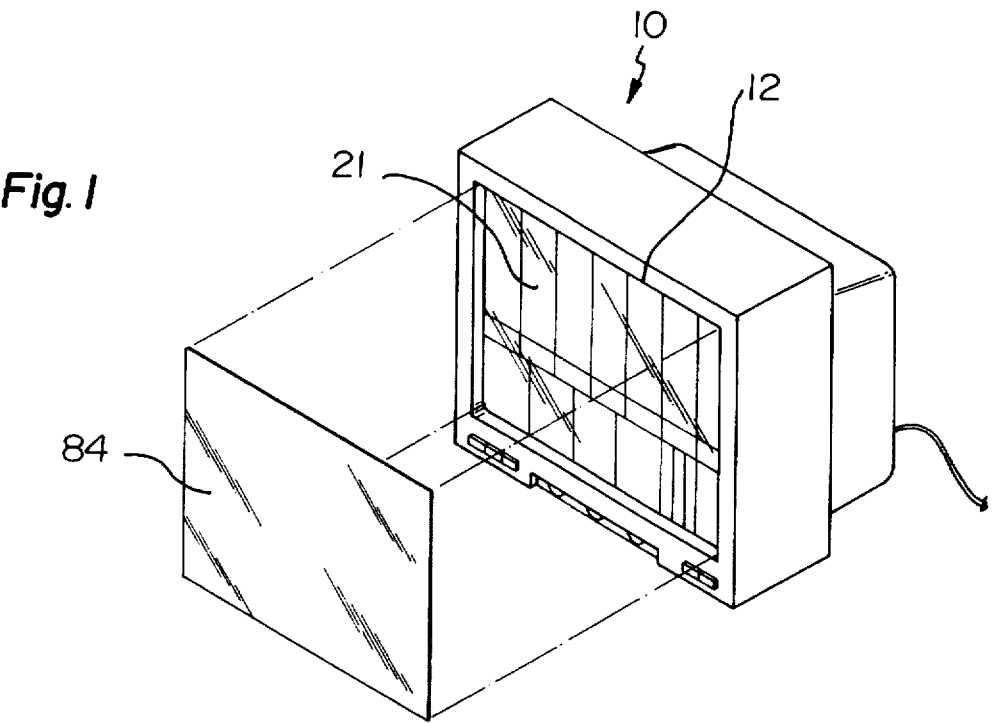
FIG. 1 is a perspective illustration of the preferred embodiment of the apparatus and method for adjusting video characteristics of a CRT screen constructed in accordance with the principles of the present invention.

With reference now to the drawings, and in particular to FIG. 1 thereof, a new and improved apparatus and method for adjusting video characteristics of a CRT screen embodying the principles and concepts of the present invention and generally designated by the reference numeral 10 will be described.

The present invention, the new and improved apparatus and method for adjusting video characteristics of a CRT screen, is comprised of a plurality of components. Such components in their broadest context include a CRT screen, a video playback mechanism, and a viewing mechanism. Such components are individually configured and correlated with respect to each other so as to attain the desired objective.

Figure 2:
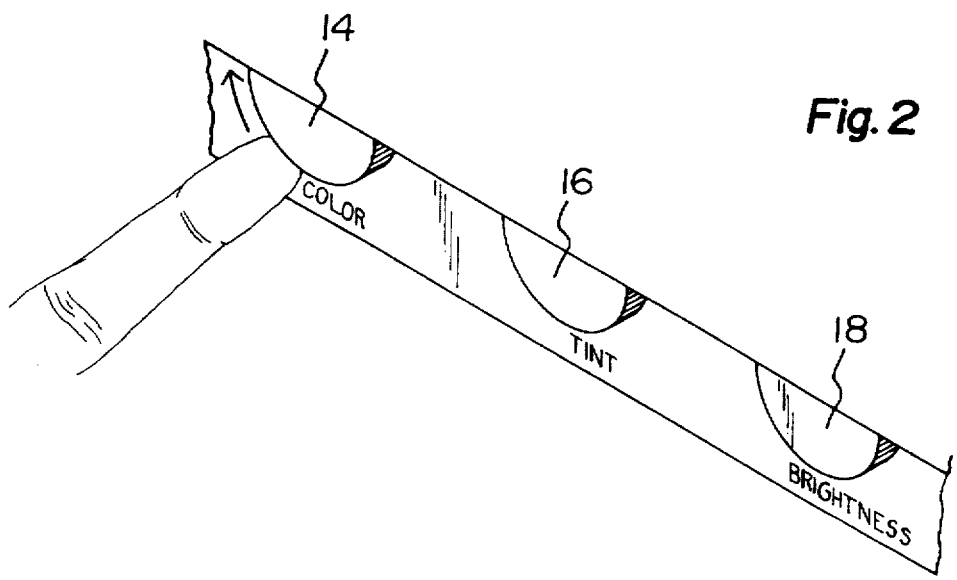
FIG. 2 is a perspective view of the adjustment mechanisms of the present invention.
Figure 3:
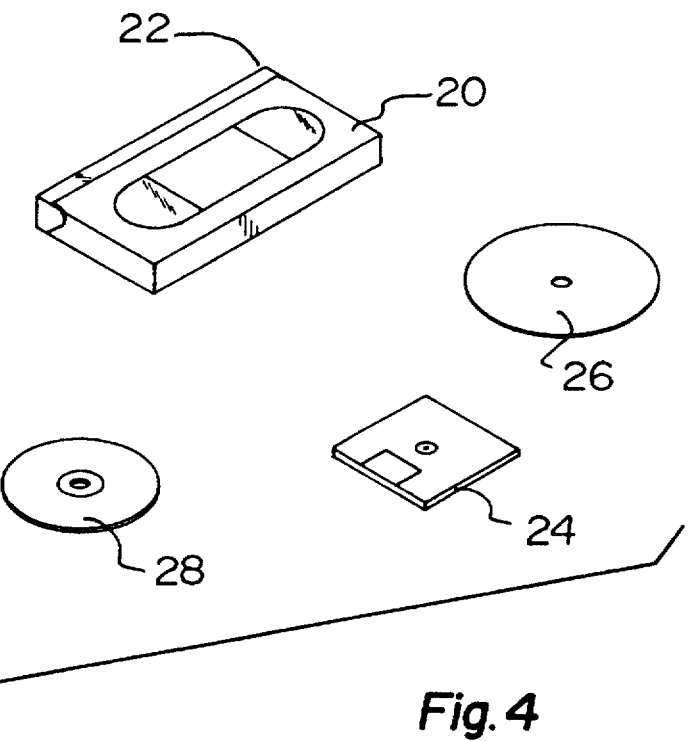
FIG. 3 is a view of the instructions and all of the video playback mechanisms of the present invention.

More specifically, it will be noted that the system 10 of the present invention includes a CRT screen 12. For allowing manipulation thereof, the CRT screen has a color adjustment mechanism 14, shown in FIG. 2, for adjusting the color of the CRT screen. A tint adjustment mechanism 16 is included for adjusting the tint of the CRT screen. In addition, a brightness adjustment mechanism 18 is included for adjusting the brightness of the CRT screen.

Figure 4:
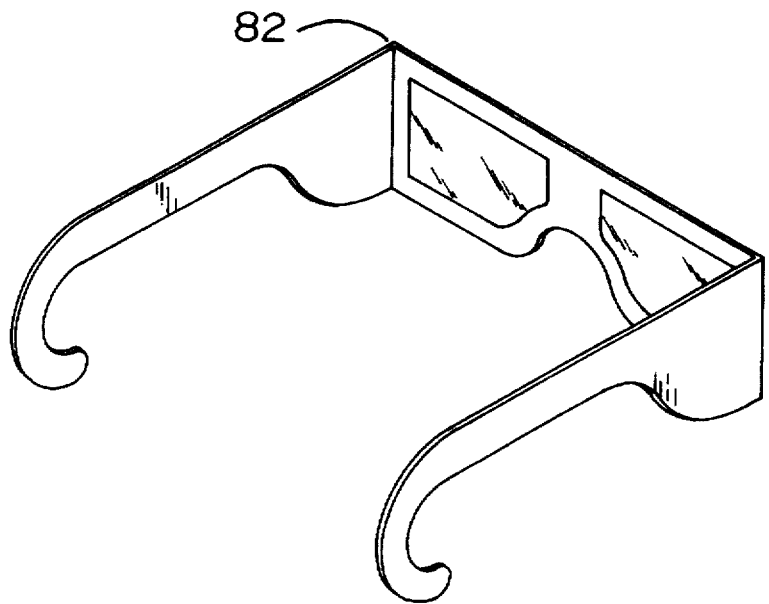
FIG. 4 is a perspective view of the viewing glasses.

As shown in FIG. 4, a video playback mechanism 20 is included for displaying a screen format 21 on the CRT video screen upon the actuation thereof. In the preferred embodiment, a video tape 22 is utilized in conjunction with a video cassette recorder electrically connected to the CRT screen. It should be noted, however, that in a plurality of alternate embodiments, video playback mechanisms such as a floppy disc 24, a laser disc 26, and a compact disk read only memory unit (CD-ROM) 28, as shown in FIG. 4 may be utilized.

The screen format 21, as best shown in FIG. 5, has an upper periphery, a lower periphery, a left periphery, and a right periphery. The screen format includes: a vertically oriented first column 30 situated adjacent the left periphery and comprising a gray upper portion 32 and a blue lower portion 34, a vertically oriented second column 36 situated adjacent the first column and comprising a yellow upper portion 38 and a black lower portion 40, a vertically oriented third column 42 situated adjacent the second column and comprising a cian upper portion 44 and a magenta lower portion 46, a vertically oriented fourth column 48 situated adjacent the third column and comprising a green upper portion 50 and a black lower portion 52, a vertically oriented fifth column 54 situated adjacent the fourth column and comprising a magenta upper portion 56 and a cian lower portion 58, a vertically oriented sixth column 60 situated adjacent the fifth column and comprising a red upper portion 62 and a black lower portion 64, and a vertically oriented seventh column 66 situated between the right periphery and the sixth column and comprising a blue upper portion 68 and a gray lower portion 70. Preferably, the lower portion of each column is approximately 1/10 the size of the upper portion thereof.

The screen format further includes a horizontally oriented row 72 situated adjacent the lower periphery beneath the lower portion of the each column. The horizontal row comprises a white block 74, a first black block 76 of a first tone of black color (7.5 ire), a second black block 78 of the first tone of black color, and a plurality of strips 80 located between the first black block and second black block. With reference still to FIG. 5, the strips are shown to include a first strip of a second tone of black color (3.5 ire) positioned adjacent the first black block, a second black strip of a third tone of black color (11.5 ire) positioned adjacent the second black block, and a third black strip of the first tone of black color positioned between the first black strip and the second black strip.

Finally, a viewing mechanism is included for viewing the CRT screen therethrough. In the preferred embodiment, a pair of viewing glasses 82 are utilized with a pair of viewing portions comprising a tinted translucent material. To facilitate wearing by a user, the viewing glasses employ a pair of supports hingably coupled to the viewing portions. It should be noted that in an alternate embodiment, the viewing mechanism comprises a rectangular sheet 84, as shown in FIG. 1, to be constructed of tinted translucent material. Such material is adapted to be statically coupled to the CRT screen. In order to allow proper fitting of the rectangular sheet on the CRT screen, a user may trim excess material therefrom. In all related embodiments, the translucent material relies on color subtraction to afford desired results. Specifically, the material is capable of deleting optical frequencies between 600 and 670 nanometers and optical frequencies between 500 and 550 nanometers. The material is adapted to pass optical frequencies between 420 and 470 nanometers. Preferably, polyester or polycarbonate is utilized for constructing the material. Optionally, a gel-filled plastic sheet may be utilized.

In use, upon viewing the screen format of the CRT screen through the viewing mechanism, the third column and the fifth column are utilized in conjunction with the tint adjustment mechanism to afford proper tint adjustment of the CRT screen. As depicted in FIG. 6, the first column and the seventh column are utilized in conjunction with the color adjustment mechanism to afford proper color adjustment of the CRT screen. To afford proper brightness adjustment of the CRT screen, the black blocks and strips are utilized in conjunction with the brightness adjustment mechanism. Lastly, the white block is utilized to check the overall adjustment of the CRT screen.

The method associated with the present invention is made possible by the inclusion of the above mentioned components. While the following description of the method of the present invention involves the preferred embodiment, it should be apparent that any of the alternate embodiments may be utilized in a similar manner. An instruction sheet 86 is included to explain the method of the present invention to a user.

In operation, the user first actuates the video tape. Next, the user views the screen format of the CRT screen through the viewing glassing. Adjustment of the screen begins with changing the tint of the CRT screen by the manipulation of the tint adjustment mechanism. Such is done until the upper portions and lower portions of the third column and the fifth column are viewed to have a similar color. The next step comprises the adjustment of the color of the CRT screen by manipulating the color adjustment mechanism until the upper portions and lower portions of the first column and the seventh column are viewed to have a similar color. To ensure optimal adjustment of the screen, the user then adjusts the tint of the CRT screen again with precision. Such is done in a manner similar to that described hereinabove. The user may then remove the viewing glasses whereat the brightness of the CRT screen is adjusted by manipulating the brightness adjustment mechanism until the second black strip of a third tone of black color is barely visible.

Additional steps may be included prior to viewing the screen format of the CRT screen through the viewing glassing. Such steps first include the darkening of an area surrounding the CRT screen. Also, the user is ideally positioned approximately 2 and 1/2 feet away from the CRT screen. Next an unillustrated contrast adjustment mechanism is placed in a median position. Conventionally, a detent is associated therewith for indication of such position. In a similar manner, a sharpness adjustment mechanism is a placed in a median position. For further providing optimal adjustment, additional steps may be included after adjusting the brightness of the CRT screen. Such steps included the adjusting the contrast adjustment mechanism to a desired position and adjusting the sharpness adjustment mechanism to a desire positioned.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the united states is as follows:

1. A new and improved apparatus and method for adjusting video characteristics of a CRT screen comprising, in combination:

a CRT screen having a color adjustment mechanism for adjusting the color of the CRT screen, a tint adjustment mechanism for adjusting the tint of the CRT screen, and a brightness adjustment mechanism for adjusting the brightness of the CRT screen;

a video tape for inserting within a video cassette recorder electrically connected to the CRT screen, the video tape adapted to display a screen format on the CRT video screen upon the actuation thereof with the screen format having an upper periphery, a lower periphery, a left periphery, and a right periphery, the screen format including a vertically oriented first column situated adjacent the left periphery and comprising a gray upper portion and a blue lower portion, a vertically oriented second column situated adjacent the first column and comprising a yellow upper portion and a black lower portion, a vertically oriented third column situated adjacent the second column and comprising a cian upper portion and a magenta lower portion, a vertically oriented fourth column situated adjacent the third column and comprising a green upper portion and a black lower portion, a vertically oriented fifth column situated adjacent the fourth column and comprising a magenta upper portion and a cian lower portion, a vertically oriented sixth column situated adjacent the fifth column and comprising a red upper portion and a black lower portion, and a vertically oriented seventh column situated between the right periphery and the sixth column and comprising a blue upper portion and a gray lower portion, the screen format further including a horizontally oriented row situated adjacent the lower periphery beneath the lower portion of the each column with a white block, a first black block of a first tone of black color, a second black block of the first tone of black color, and a plurality of strips located between the first black block and second black block, the strips including a first strip of a second tone of black color positioned adjacent the first black block, a second black strip of a third tone of black color positioned adjacent the second black block, and a third black strip of the first tone of black color positioned between the first black strip and the second black strip; and a pair of viewing glasses with a pair of viewing portions comprising a tinted translucent material, the viewing glasses further having a pair of supports hingably coupled to the viewing portions for allowing the viewing glasses to be worn by a user and further allow viewing of the screen format of the CRT screen therethrough, whereby upon viewing the screen format of the CRT screen through the viewing glassing, the third column and the fifth column are utilized in conjunction with the tint adjustment mechanism to afford proper tint adjustment of the CRT screen, the first column and the seventh column are utilized in conjunction with the color adjustment mechanism to afford proper color adjustment of the CRT screen, the black blocks and strips are utilized in conjunction with the brightness adjustment mechanism to afford proper brightness adjustment of the CRT screen, and the white block is utilized to check the overall adjustment of the CRT screen.

2. An apparatus for adjusting video characteristics of a CRT screen comprising:

a CRT screen having a plurality of adjustment mechanism or adjusting visual characteristics of the CRT screen;

a video playback means adapted to display a screen format on the CRT video screen upon the actuation thereof with the screen format comprising a plurality of colors; and a viewing means adapted to allow viewing of the screen format of the CRT screen therethrough, whereby upon viewing the screen format of the CRT screen through the viewing means, a user may manipulate the adjustment mechanisms for properly adjusting visual characteristics of the CRT screens wherein the screen format includes an upper periphery, a lower periphery, a left periphery, and a right Periphery, the screen format further including a vertically oriented first column situated adjacent the left Periphery and comprising a gray upper portion and a blue lower portion, a vertically oriented second column situated adjacent the first column and comprising a yellow upper portion and a black lower portion, a vertically oriented third column situated adjacent the second column and comprising a cian upper portion and a magenta lower portion, a vertically oriented fourth column situated adjacent the third column and comprising a green upper portion and a black lower portion, a vertically oriented fifth column situated adjacent the fourth column and comprising a magenta upper portion and a cian lower portion, a vertically oriented sixth column situated adjacent the fifth column and comprising a red upper portion and a black lower portion, and a vertically oriented seventh column situated between the right periphery and the sixth column and comprising a blue upper portion and a gray lower portion.

3. An apparatus for adjusting video characteristics of a CRT screen as set forth in claim 2 wherein the video playback means comprises a video tape for inserting within a video cassette recorder electrically connected to the CRT screen.

4. An apparatus for adjusting video characteristics of a CRT screen as set forth in claim 2 wherein the video playback means comprises a laser disc.

5. An apparatus for adjusting video characteristics of a CRT screen as set forth in claim 2 wherein the video playback means comprises a compact disc read only memory unit.

6. An apparatus for adjusting video characteristics of a CRT screen as set forth in claim 2 wherein the video playback means comprises a floppy disk.

7. An apparatus for adjusting video characteristics of a CRT screen as set forth in claim 2 wherein the viewing means comprises a pair of viewing glasses with a pair of viewing portions comprising a tinted translucent material.

8. An apparatus for adjusting video characteristics of a CRT screen as set forth in claim 2 wherein the viewing means comprises a rectangular sheet of tinted translucent material adapted to be statically coupled to the CRT screen.

9. An apparatus for adjusting video characteristics of a CRT screen as set forth in claim 2 wherein the screen format includes a horizontally oriented row situated adjacent the lower periphery beneath the lower portion of the each column with a white block, a first black block of a first tone of black color, a second black block of the first tone of black color, and a plurality of strips located between the first black block and second black block, the strips including a first strip of a second tone of black color positioned adjacent the first black block, a second black strip of a third tone of black color positioned adjacent the second black block, and a third black strip of the first tone of black color positioned between the first black strip and the second black strip.

10. An apparatus for adjusting video characteristics of a CRT screen as set forth in claim 9 and further including a color adjustment mechanism for adjusting the color of the CRT screen, a tint adjustment mechanism for adjusting the tint of the CRT screen, and a brightness adjustment mechanism for adjusting the brightness of the CRT screen.

11. An apparatus for adjusting video characteristics of a CRT screen as set forth in claim 10 whereby upon viewing the screen format of the CRT screen through the viewing glassing, the third column and the fifth column are utilized in conjunction with the tint adjustment mechanism to afford proper tint adjustment of the CRT screen, the first column and the seventh column are utilized in conjunction with the color adjustment mechanism to afford proper color adjustment of the CRT screen, the black blocks and strips are utilized in conjunction with the brightness adjustment mechanism to afford proper brightness adjustment of the CRT screen, and the white block is utilized to check the overall adjustment of the CRT screen.

12. A method of adjusting a CRT screen comprising the steps of:

provididng a CRT screen having a color adjustment mechanism for adjusting the color of the CRT screen, a tint adjustment mechanism for adjusting the tint of the CRT screen, and a brightness adjustment mechanism for adjusting the brightness of the CRT screen;

providing a video tape for inserting within a video cassette recorder electrically connected to the CRT screen, the video tape adapted to display a screen format on the CRT video screen upon the actuation thereof with the screen format having an upper periphery, a lower periphery, a left periphery, and a right periphery, the screen format including a vertically oriented first column situated adjacent the left periphery and comprising a gray upper portion and a blue lower portion, a vertically oriented second column situated adjacent the first column and comprising a yellow upper portion and a black lower portion, a vertically oriented third column situated adjacent the second column and comprising a cian upper portion and a magenta lower portion, a vertically oriented fourth column situated adjacent the third column and comprising a green upper portion and a black lower portion, a vertically oriented fifth column situated adjacent the fourth column and comprising a magenta upper portion and a cian lower portion, a vertically oriented sixth column situated adjacent the fifth column and comprising a red upper portion and a black lower portion, and a vertically oriented seventh column situated between the right periphery and the sixth column and comprising a blue upper portion and a gray lower portion, the screen format further including a horizontally oriented row situated adjacent the lower periphery beneath the lower portion of the each column with a white block, a first black block of a first tone of black color, a second black block of the first tone of black color, and a plurality of strips located between the first black block and second black block, the strips including a first strip of a second tone of black color positioned adjacent the first black block, a second black strip of a third tone of black color positioned adjacent the second black block, and a third black strip of the first tone of black color positioned between the first black strip and the second black strip;

providing a pair of viewing glasses with a pair of viewing portions comprising a tinted translucent material, the viewing glasses further having a pair of supports hingably coupled to the viewing portions for allowing the viewing glasses to be worn by a user and further allow viewing of the screen format of the CRT screen therethrough;

actuating the video tape;

viewing the screen format of the CRT screen through the viewing glassing;

adjusting the tint of the CRT screen by manipulating the tint adjustment mechanism until the upper portions and lower portions of the third column and the fifth column are viewed to have a similar color;

adjusting the color of the CRT screen by manipulating the color adjustment mechanism until the upper portions and lower portions of the first column and the seventh column are viewed to have a similar color;

adjusting again with precision the tint of the CRT screen by manipulating the tint adjustment mechanism until the upper portions and lower portions of the third column and the fifth column are viewed to have a similar color;

removing the viewing glasses; and adjusting the brightness of the CRT screen by manipulating the brightness adjustment mechanism until the second black strip of the third tone of black color is barely visible.

13. A method of adjusting a CRT screen as set forth in claim 12 comprising the following steps prior to viewing the screen format of the CRT screen through the viewing glassing:

darkening an area surrounding the CRT screen;

positioning a user approximately 2 and ½ feet away from the CRT screen;

placing a contrast adjustment mechanism is a median position; and placing a sharpness adjustment mechanism is a median position.

14. A method of adjusting a CRT screen as set forth in claim 13 comprising the following steps after adjusting the brightness of the CRT screen:

adjusting the contrast adjustment mechanism to a desire positioned; and adjusting the sharpness adjustment mechanism to desire positioned.

* * * * *